A. B. WILLOUGHBY.
PROCESS OF AND APPARATUS FOR PULVERIZING AND TREATING ORES, CLAY, AND OTHER MINERAL SUBSTANCES.
APPLICATION FILED MAY 6, 1914.
1,246,514.
Patented Nov. 13, 1917.
5 SHEETS—SHEET 4.
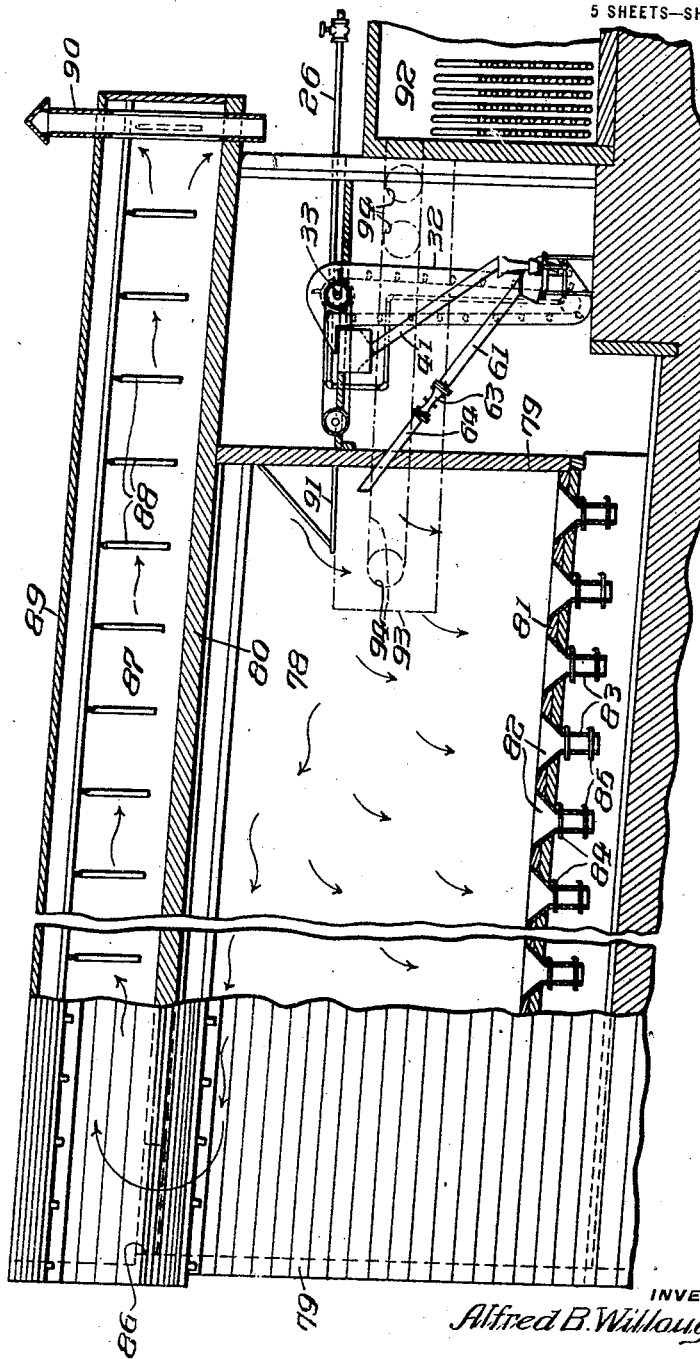
INVENTOR
Alfred B. Willoughby
WITNESSES
BY
ATTORNEY

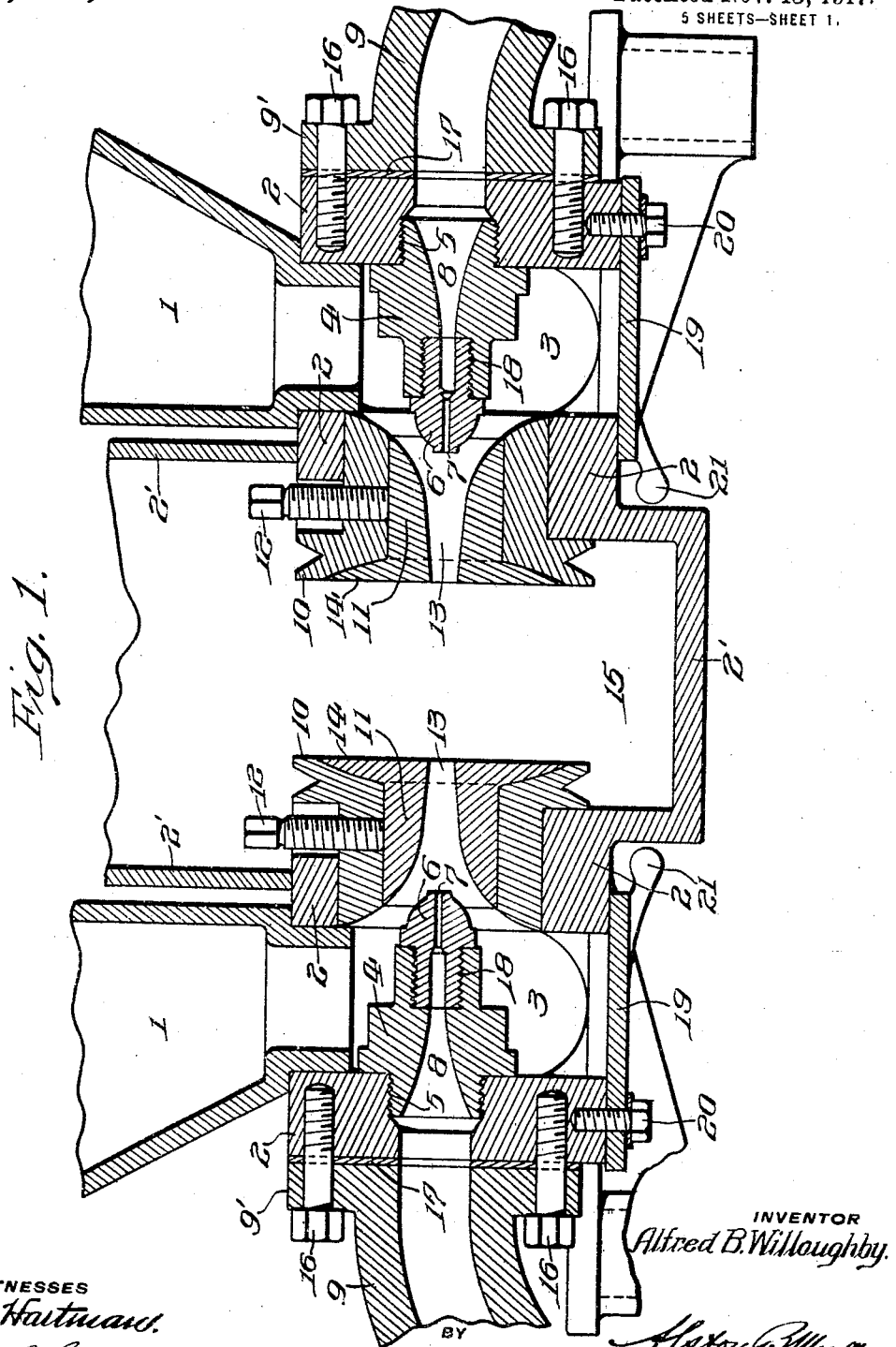

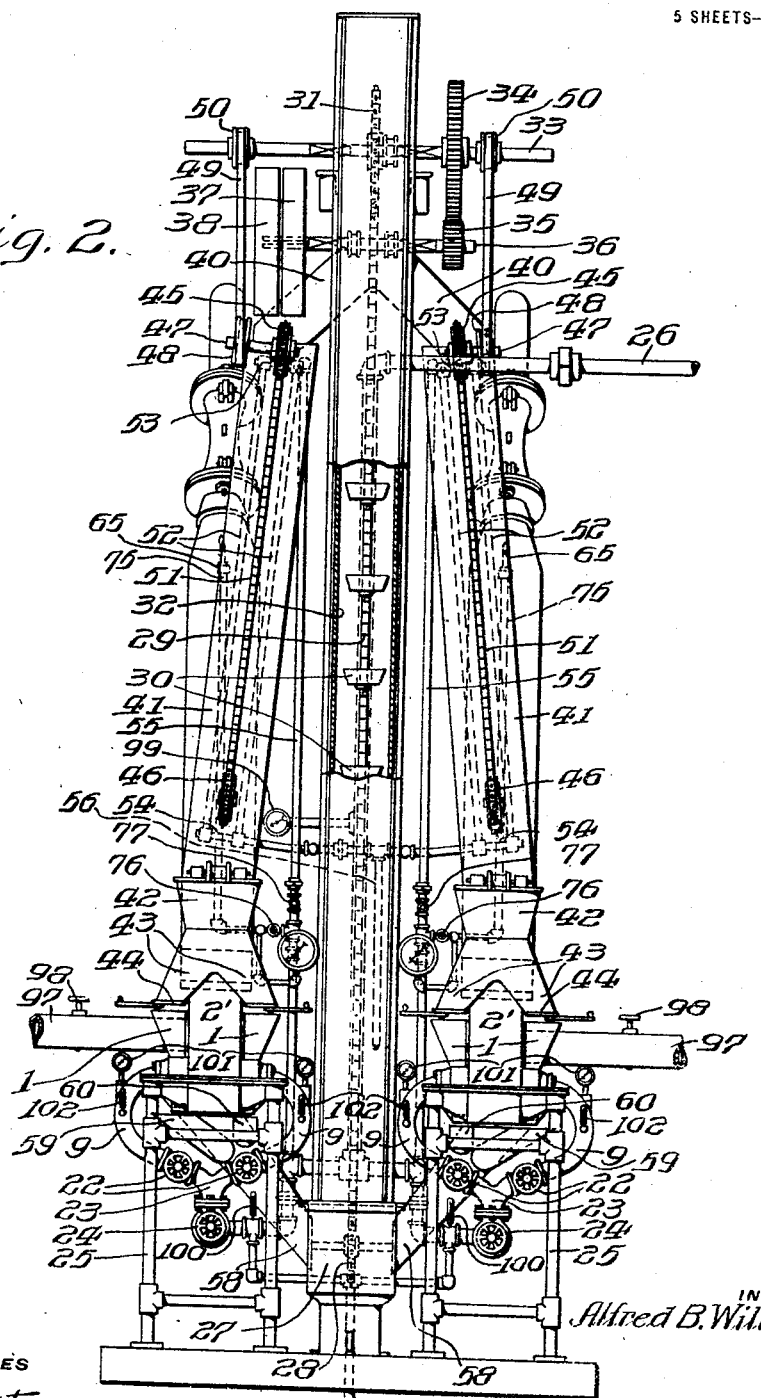

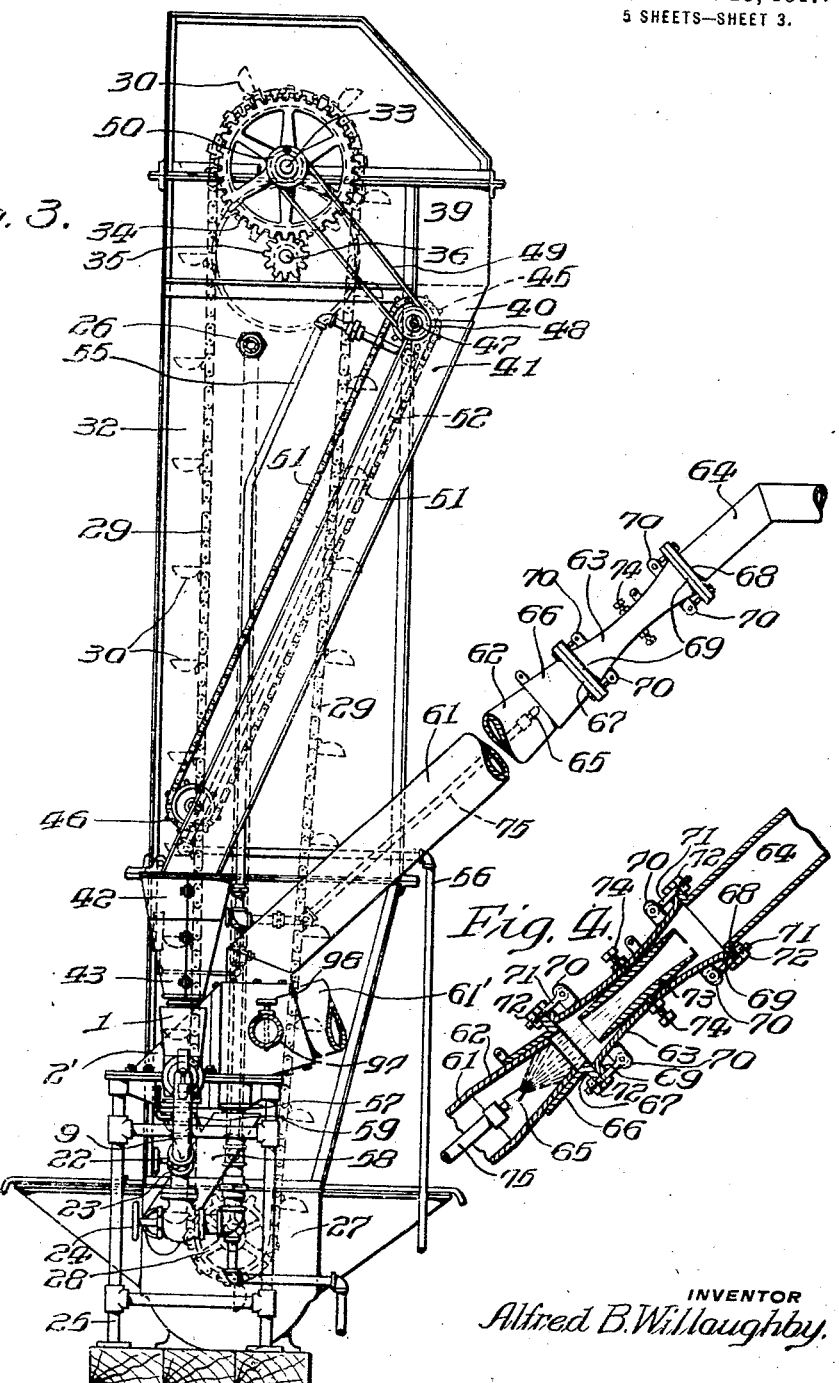

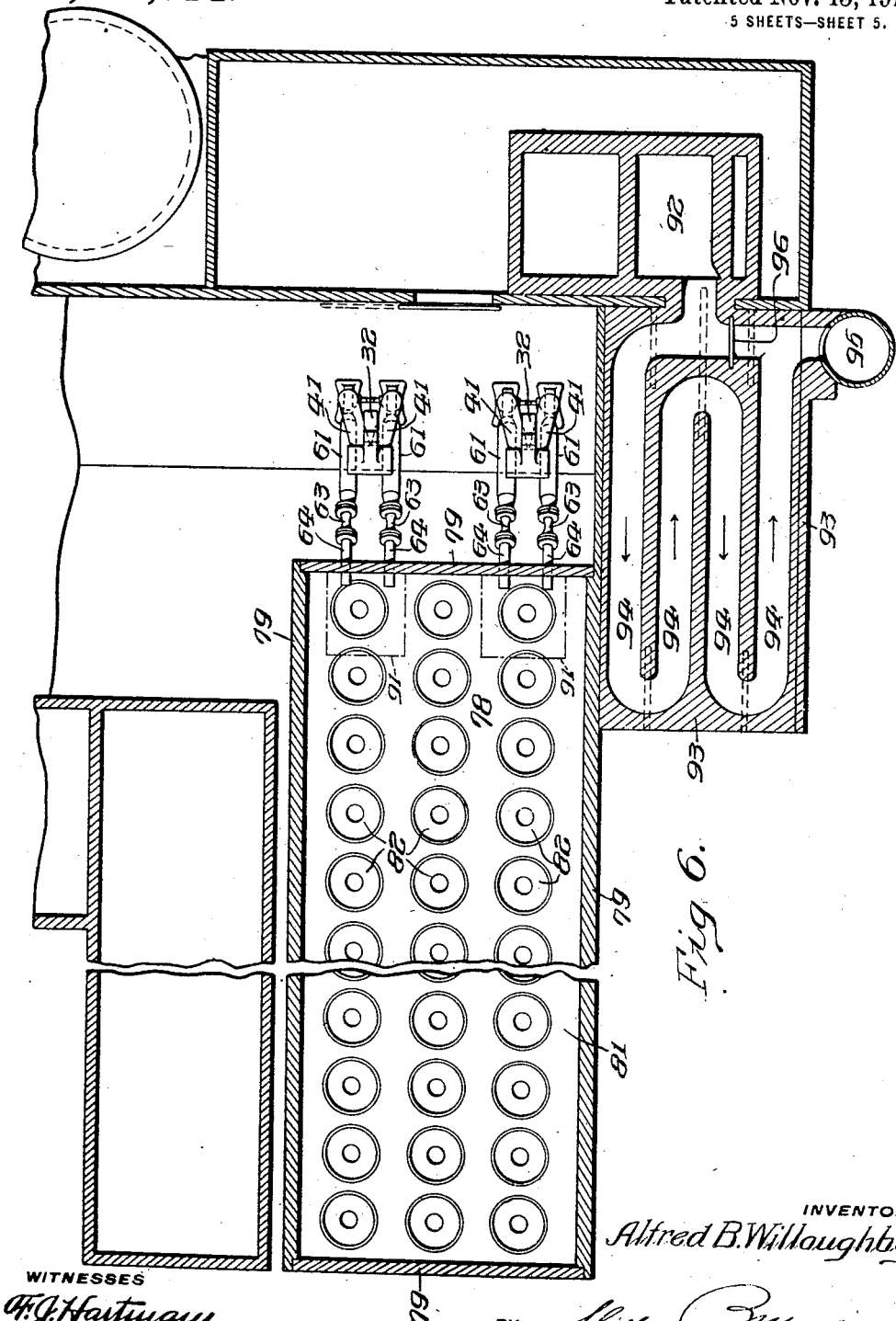

UNITED STATES PATENT OFFICE.

ALFRED B. WILLOUGHBY, OF PHILADELPHIA, PENNSYLVANIA.

PROCESS OF AND APPARATUS FOR PULVERIZING AND TREATING ORES, CLAY, AND OTHER MINERAL SUBSTANCES.

1,246,514.            Specification of Letters Patent.      Patented Nov. 13, 1917.

Application filed May 6, 1914. Serial No. 836,689.

*To all whom it may concern:*

Be it known that I, ALFRED B. WILLOUGHBY, a citizen of the United States, residing at Philadelphia, in the county of Philadelphia and State of Pennsylvania, have invented certain new and useful Improvements in Processes of and Apparatus for Pulverizing and Treating Ores, Clay, and other Mineral Substances, of which the following is a specification.

Invention of this application relates to the process or method of pulverizing mineral substances such as ores, clay, etc., and to the machines and apparatus for carrying out the said process, and the invention more particularly relates to the pulverizing of ores and other minerals by the impact against each other at high velocity of the pieces or particles of the mineral being treated; to the separation of the particles which have been pulverized to the required size or degree of fineness from the particles which have not been reduced to such state; and the conveying away from the pulverizing apparatus of the pulverized material; to the treatment of the finely divided material during its passage away from the pulverizer to the action of gases or vapors which chemically affect or act upon the pulverized material; and to the method and manner of collecting the pulverized material in suitable bins or settling chambers.

Among the objects of my invention are to provide an efficient dependable continuously acting apparatus by means of which earthy materials or minerals may be rapidly finely comminuted by the impact of two opposing streams of the said relatively coarse material impelled against each other at high velocity by jets of superheated steam at high pressure; to provide an impact pulverizer in which the steam, employed as the pulverizing and conveying agency or medium, is prevented from condensing in the ducts or chambers through or to which it and the pulverized material is conveyed; to provide means for accurately ascertaining and determining both before the apparatus is put into operation and while the same is being operated, the temperature and pressure of the superheated steam prior to its admission to and as it is passed into the pulverizing apparatus.

Further objects of my invention are to provide means for accurately regulating and controlling the flow of the superheated steam to the pulverizing chamber; to provide a construction whereby the openings through which the superheated steam is admitted into the pulverizing chamber may be accurately alined; to insure a continuous and steady feed of the ore or other material to be pulverized to the pulverizer and to eliminate substantially all moisture from the material prior to its delivery to the action of the pulverizer.

Further objects of my invention are to prevent the formation of moisture through ducts or passages through which the pulverized material is conducted to the settling chambers or bins by the use of steam of substantially the same pressure and temperature as that admitted to the pulverizer proper; to operate the vacuum forming chamber of the conveyer system; to introduce sufficient live superheated steam of substantially the temperature of the steam admitted to the pulverizing chamber, to reheat the spent steam from the pulverizers and to maintain the temperature of the settling or collecting bins sufficiently high to prevent the condensation of steam therein.

Further objects of my invention are to provide steam jets in the pulverizer which will tend to maintain the perfect alinement of opposed jets; to provide for ready and convenient access to the interior of the pulverizing chamber for the purpose of alinement, adjusting, replacing or repairing the pulverizing jets; to utilize the heat of the hot gases of combustion from boilers used in generating steam for the pulverizer, to dry the raw and untreated ore; to provide means for introducing into the conveyer, by means of which the pulverized material is conveyed away from the pulverizing chamber, gases or vapors to act chemically upon the pulverized material during its passage to and within the settling bins or chambers; to maintain the pulverized material which settles in the bins, dry, notwithstanding the fact that steam is employed in conducting the material thereto, so that dry pulverized material may be drawn off as a powder therefrom in predetermined measured quantities, and to provide a method of treating ores whereby the ores are pulverized by the impact of opposed alined instruments of superheated steam, and conveyed to and collected in settling bins without condensation or precipitation of the steam until it makes its final exit from the said bins.

Further objects of my invention will appear in the specification and claims below.

Referring now to the drawings forming a part of this application in which the same reference characters are employed to designate the same parts throughout the various views:

Figure 1 is a sectional view of the pulverizing chamber through the jets for the admission of steam thereto, and showing the passages through which the material is conveyed or conducted to the pulverizing action of the jets;

Fig. 2 is a front elevational view of a portion of my improved pulverized apparatus, the settling and collecting bins being not shown;

Fig. 3 is a side elevational view of the same;

Fig. 4 is a fragmentary longitudinal sectional view of the steam ejector apparatus for removing the pulverized material from the pulverizing chamber, impelling it into the settling bins; for reheating the spent steam and maintaining the temperature of the bins sufficiently high to prevent condensation;

Fig. 5 is a longitudinal sectional view through the bin or settling chambers showing the relative location of the pulverizing mechanism thereto, and the course of the steam and pulverized material therethrough;

Fig. 6 is a horizontal sectional plan view of the settling chamber or bin, similar to that shown in Fig. 5, and showing the manner of employing the spent gases of the furnace or boiler used in generating steam for the pulverizers, to heat and dry the ore or similar material before the same is fed to the pulverizers.

Inasmuch as the feeding mechanism and the mechanism for conveying the pulverized material away from the pulverizing chamber relates specifically to and is adapted for use in conjunction with an impact pulverizer in which ore is supplied from hoppers to chambers surrounding a pair of alined steam jets, the action of which is to impel two streams of ore against each other at a velocity sufficiently high to reduce the particles of the ore as they strike against each other to powder, a detailed descripton of my pulverizing mechanism proper should first be thoroughly understood.

Referring, then, to Fig. 1 the lower ends of the feed hoppers 1—1 are fitted into suitable openings in the casing 2 to discharge into chambers 3—3 therein. Projecting transversely substantially through said chambers are a pair of alined nozzles 4—4 tightly secured to the casing 2 by screw thread connections 5. The adjacent ends of the nozzles 4 are each provided with nipples 6—6 tightly secured therein and provided axially with jet openings 7—7. Said nipples are preferably of very hard steel and the jet openings 7—7 therethrough circular or cross-section are of small uniform diameter (substantially a little less than ⅛ of an inch in diameter) and are preferably in length 10 or 12 times the diameter of the same. The openings 7'—7' in the nipples 6—6 at the rear of the opening 7—7 may be of larger diameter and are arranged in alinement with suitable openings 8—8 through the nozzles 4. Secured to the casing 2 with their upper ends in alinement with the openings through the nozzles and nipples are the goose necks 9—9 through which steam from any suitable source may be conducted to the nozzles 4—4 and nipples 6—6.

In the casing 2 and between the nozzles and in alinement therewith are suitable bushings 10—10 within which are fitted wearing tubes 11—11 of hard steel rigidly secured therein in any suitable manner as by setscrews 12—12. These wearing tubes 11—11 are preferably provided with tapering openings 13—13 therethrough, the said openings being the smallest at the end most remote from the end of its respective nipple 6. The end of the nipple 6 preferably projects slightly into the larger end of the opening 13. The adjacent ends of the wearing tubes 11—11 are preferably provided with flanges 14 fitting into suitable recesses in the adjacent faces of the bushing 10. The space between the bushings 10 is inclosed by the casing 2' to form the crushing or pulverizing chamber 15.

It is apparent that the ends of the goose necks 9 should be secured to the casing 2 by a steam tight connection, as by screws 16 passing through suitable flanges 9' on the ends of the goose necks 9 and through suitable gaskets or packings 17 between the faces of the flanges 9' and the adjacent face of the casing 2. The nipple 6 is also preferably connected to their nozzles by screw threads 18, and this threaded connection and the threaded connection between the nozzle and the casing 2 are preferably steam tight. The openings 19' in the lower sides of chambers 3—3 are preferably closed on their lower sides by suitable gates or closures 19—19, each of which is pivotally mounted on a suitable screw 20. These gates 19—19 are preferably provided with handles 21, by means of which the gates or closures 19—19 may be swung about their pivot bolts 20—20, and the entire interior of the chambers 3 made accessible, as will be again referred to below.

Now the disposition of the pulverizing apparatus proper, above described, with respect to the mechanism for supplying material to be pulverized to the action of the steam jets; to the mechanism for conveying the pulverized material to the settling bins or chambers; and to the mechanism for conveying the material which has not been reduced to the desired state of fineness back to the feeding mechanism, may be readily understood from Figs. 2 and 3 in which a duplex arrangement of pulverizing mechanism or apparatus is shown. Each pulverizing mechanism is provided with a pair of feed hoppers 1—1, a pair of goose necks 9—9 entering into the opposite sides of the casing 2 and with a pulverizing chamber formed by the casing 2′ closing the space between the pulverizing jets. Each goose neck 9 is preferably provided with a regulating valve 22 and the two goose necks are suitably coupled, between said valves 22, to a supply pipe 23, also provided with a valve 24 for admitting steam to or cutting off steam from the goose necks 9—9 and consequently to the pulverizing jets. The whole casing 2 with the goose necks and piping are supported upon any suitable frame work 25. The pipes 24 of the two pulverizing mechanisms are preferably coupled to a main supply pipe 26 connected to any suitable source of superheated steam under pressure.

Preferably arranged between the pulverizing mechanisms is a hopper 27 extending downwardly between the pulverizing mechanisms so that the ore or other material being treated may be shoveled into the same from either side of the pulverizers and within said hopper 27 is mounted a pulley 28, around which an endless conveyer chain 29 with elevating buckets 30 passes, the upper end of said conveyer chain passing a driving pulley 31 mounted near the top of the apparatus. This conveyer chain 29 with its buckets 30, and the pulleys 28 and 31, are all preferably inclosed within a casing 32. The upper driving pulley 31 is mounted upon a suitable shaft 33, and that in turn may be provided with a spur gear 34 meshing with a pinion 35 on a countershaft 36, provided with any suitable means for imparting a rotative movement thereto, as for instance, a tight pulley 37 and a loose pulley 38.

The conveyer buckets 30 are arranged to elevate material from the hopper 29 and over the upper pulley of the driving pulley 31 and to empty their contents into the upper main supply box or hoppers 39, which communicate with two diverging branch chutes 40, each of which discharge directly into a chute or hopper 41, which feeds directly downwardly and discharges into a petticoat hopper 42. These petticoat hoppers 42 are in turn provided with branches 43, terminating directly over and communicating with the feed hoppers 1 of the pulverizers proper. The lower ends of the branches 43 of the petticoat hoppers 42 are preferably each provided with a valve or closure 44, by means of which the supply of ore from the petticoat hoppers 42 to the feed hoppers 1, may be cut off at will.

Each chute 41 is preferably provided with a means for insuring a constant downward motion or feed of the material therethrough, and for this purpose upon the upper and lower ends of the chute 41 are mounted a pair of chain pulleys 45—46. The upper chain pulley 45 being mounted upon a shaft 47 provided with a pulley 48 around which a belt 49 passes, said belt also passing around a driving pulley 50 on the main shaft 33; one length of the shaft 51, which passes around the chain pulleys 45—46, extend downwardly within the chute 41, around the lower pulley 46, while the other length or course of the chain on its return movement passes outside of the chute 41. Motion is also communicated from the shaft 33 to the chain 51 and that length of the chain which is within the chute 41 travels slowly downwardly a little faster than the material within the chute would normally feed downwardly by gravity to the petticoat hoppers 42.

Within each chute 41 is also a plurality of lengths of steam piping 52, the upper ends of which are connected to the header or manifold 53, and the lower ends of which are similarly connected to the header or manifold 54. A steam pipe 55 connects the main steam pipe 26 with the upper header 53 and exhaust pipe 56 connects the lower headers 54 with the open air or to any suitable condenser.

Each pulverizing chamber 15 is provided with a gate or closure 57 directly over the upper open end of a tailing chute 58, the lower end of which extends to the hopper 27 and the tailing chute 58 is preferably provided with two branches 59 and 60 extending upwardly and under the gates 19 of the chambers 3 surrounding the steam jets. This provides an arrangement whereby from time to time the coarser particles of ore which accumulate in the pulverizing chamber 15 and which are too heavy to be carried by the exhaust draft (later described) may from time to time be discharged into the tailing chute by opening the gage 57, and thence this ore or material is returned to the hopper 27 to be elevated again by the conveyer buckets 30 and again fed into the chutes delivering to the pulverizers. The uncrushed material which may accumulate in the chambers may be similarly allowed from time to time to fall into the tailing chute, particularly when the pulverizing operation is suspended; that is to say, if for any reason, it is necessary to stop the pulverizers, the steam may be shut off from the pulverizers, the gates 44 may be closed, and then the gates or closures 49 may be opened, allowing the material in the feed hoppers 1 and in the chambers 3 to fall into the tailing chute, thereby leaving the interior of the pulverizers free of material and convenient of access for repairs, adjustment or any other purpose.

Leading from the pulverizing chamber 15 and connected to the casing 2' is an exhaust pipe 61 preferably extending upwardly and rearwardly from the casing 2'. The upper end of this exhaust pipe 61 is preferably tapered as at 62 and communicates with a contracted portion or throat 63. The other end of this contracted portion 63 is secured to a conveyer pipe or tube 64 which leads to the settling bins or chambers.

The throat 63 together with the tapering end 62 of the pipe 61 form with a nozzle 65 located axially of the pipe 61 and discharging into the tapered portion thereof, a steam ejector; said nozzle 65 being of any approved type whereby a flaring jet of steam is discharged therefrom axially of the pipe 61 and into the contracted portion 63. The action of this ejector is to draw the finer particles of pulverized material upwardly out of the pulverizing chamber 15 and to impel them through the pipe 64 to the settling bins.

The throat or contracted portion 63 is preferably removable or detachable from the tapered end 62 of the exhaust pipe 61 and from the communicating end of the discharge pipe 64. For this purpose I preferably provide the tapering end 62 of the pipe 61 with a sleeve 66 fitting over said tapered portion 62, secured thereto in any suitable manner, and provided with a flange 67. I also preferably provide the pipe 64 with a flange 68. The opposite ends of the throat or contracted portion 63 is also preferably provided with flanges 69—69, and adjacent the flanges on the throat 63 I provide radially extending lugs 70 in which bolts 71 are secured on pivots extending transversely to the axis of the throat or contracted portion 63. The flanges 67, 68, 69 and 69 are preferably radially notched to permit the bolts 71 to be swung therein to a position parallel with the axis of the throat 63 and at right angles to the plane of the said flanges. Said bolts 71 are preferably provided with nuts 72. By reason of this construction the throat or contracted portion 63 may be readily removed from the exhaust pipe 62 and from discharge pipe 64 by loosening the nuts 72 and swinging the bolts 71 out of the notches in the flanges 67, 68, 69 and 69. This arrangement provides a very convenient way of removing the throat or contracted portion whenever necessary, as for instance, to replace a worn wearing tube 73 with a new one, for inasmuch as the throat or contracted portion 63 is subjected to considerable wear due to the striking of the pulverized particles of ore or similar material against the inner side thereof at a high velocity, the throat 63 is preferably provided with a wearing tube or bushing 73. This tube 73 may be readily removed from the throat 63 by separating the throat from the adjacent ends of the exhaust tube 61 and discharge tube 64 and then loosening the bolts 74 by means of which the wearing tube 73 is secured within the throat 63. I prefer to supply steam to the exhausting nozzle 65 of the ejector through a pipe 75 extending substantially throughout the full length of the exhaust tube 61. Said tube 75 communicates directly to the steam pipe 55, which in turn, as above described, is directly connected to the steam pipe 26, through which superheated steam, at high temperature, is conducted to the pulverizers. A suitable valve 76 is provided in the pipe 75 to regulate the amount of steam admitted to the nozzle 65. A valve 77 may also be placed in the pipe 55 for regulating the amount of steam supplied to the header or manifold 53 and hence to the steam pipe or radiators 52 within the chutes 41.

Having thus described with particularity the construction of the mechanisms for pulverizing the ore; for conveying the pulverized ore away from the pulverizers, and for feeding the ore to the pulverizers, the construction of the settling bins to which the pulverized ore is conveyed and within which it is allowed to settle, and the relation of the pulverizing and conveying mechanisms with respect to the settling bins or chambers will readily be had by reference more particularly to Figs. 5 and 6. A battery of pulverizing mechanisms is shown in Fig. 5, as connected to and discharging the pulverized ore into the settling chamber 78, said chamber being shown in a longitudinal sectional view. Fig. 6, is a plan view of the apparatus shown in Fig. 5, the settling chamber being shown in horizontal plan section. From the exhaust pipes 64 the pulverized ore is impelled, by the live steam discharged through the jet 65, into the settling bin 78, the walls and floors of which are preferably of substantially water proof material which is not conductive of heat. The side and end walls 79 and the ceiling 80 are preferably of concrete and the bottom or floor 81 is also preferably of concrete material. This settling bin 78 is a long relatively narrow structure, and the bottom or floor 81 is preferably provided with a plurality of circular conical depressions 82. These conical depressions 82 communicate with vertically disposed pipes 83 leading therefrom. If desired, the pipes 83 may be constructed so as to enable the operator to draw off from the bottom of the bin 78 dry pulverized material in predetermined quantities. To do this the pipes 83 are preferably provided with two valves or closures 84 and 85, the cubical contents of the pipes 83 between the upper closure 84 and the lower closure 85 being fixed and predetermined. When the bottom of the bin 78 is covered with a dry powder or pulverized material the valve 84 may be first opened, whereupon the tube or pipe 83 will fill with dry material. The valve 83 may then be closed and a bag or sack drawn over the lower end of the tube 83 after which the valve 85 may be opened, whereupon the predetermined quantity of material between the valves 84 and 85 will fall into the sack. If desired, of course, the material may be similarly deposited in barrels. In this way a sack full or a barrel full or a keg full of powdered material may be drawn off or out of the bin 78 in measured quantities in a very rapid and easy manner.

The top of the remote end of the bin is provided with an opening 86 which leads into a smaller narrow return passage or chamber 87 extending substantially the full length of the bin or chamber 78. Indeed it may overhang the bin 78, as shown in Fig. 5. In this return passage or chamber 87 suitable baffle plates 88 are suspended or fixed in such a manner that the larger passage is beneath the baffle plates. However, some space should be allowed between the top of the baffle plates 88 and the top wall 89 of the return passage 87 in order to permit the plates 88 to act as baffle plates and arrest particles of solid pulverized material which may have been carried up through the opening 86 into the return passage or chamber 87. The end of the return passage or chamber 87 may be provided with a chimney or stack 90 into which the steam which has passed through the settling bin 78 and the return passage 87 may make its escape to the open air.

The discharge pipe 64 preferably is arranged to discharge obliquely against the baffle plates 88' located in said bin or chamber 78 adjacent the discharge end of said pipe 64 to serve to break up the stream of steam and pulverized material coming out of the discharge pipe 64 and tends to distribute the pulverized material throughout the chamber 78.

A boiler 91 by means of which superheated steam at high pressure may be supplied to the apparatus through the pipe 26 is preferably located adjacent the pulverizing apparatus. The furnace or boiler 91 is preferably so arranged that the gases of combustion are conducted to and caused to circulate through an apparatus for subjecting the raw or untreated ore to a preliminary drying. This apparatus which is clearly indicated in full lines in Fig. 6, and in dotted lines in Fig. 5, and comprises a casing 93 provided with a tortuous passage 94 leading from the boiler 91 to a stack or chimney 95. This apparatus is preferably provided with a gate or damper 96 whereby the gases of combustion may be caused at will to traverse through the tortuous passage 94 of the apparatus 92, or to pass directly from the boiler 91 to the stack 95.

This apparatus for preliminary drying the untreated or unpulverized material is preferably arranged substantially on a level with the upper end of the feeding mechanism for the pulverizers, as indicated in Fig. 5. The whole apparatus is designed and arranged so that raw or untreated ore or material may be either deposited upon the platform 93' above the heating apparatus and at the top of the feeding mechanism for the pulverizers, or may be supplied to the pulverizing mechanism through the hoppers 27. I preferably however arrange the apparatus so that the raw material is delivered to the floor or platform 93' above the heating apparatus, and the chain conveying and conveying mechanism heretofore described is preferably employed to return to the upper level and thence to the chutes 41 that material which is passed through the pulverizing mechanism or apparatus but has not been reduced to the desired state of fineness.

In some instances it is desirable to treat the material immediately after it has been pulverized and during its passage to and through the exhaust pipe 61, conveyer pipe 64, bin 78 and return chamber 87, with some gas or vapor, as carbonic acid gas, to chemically act upon the minute particles of pulverized material and to do this I preferably attach to each pulverizing chamber, adjacent the lower end of the exhaust pipe 61, a supply pipe 97 provided with a hand valve 98. When said valve 98 is open the gas or vapor, which will chemically act upon the pulverized ore, will be drawn into the pulverizing chamber 15 and through the pipe 97, and, with the pulverized ore, will traverse the exhaust pipe 61 and discharge pipe 64 and enter into the bin 78. This treatment of ores is particularly useful in the making of pigments and bleaching clay.

In Fig. 3, I have further indicated a second exhaust pipe 61' connected to the pulverizing chamber 15 so that when desired the pulverized material may be conveyed away from the pulverizing chamber 15 of each pulverizing apparatus through two exhaust pipes. It is to be understood that the exhaust pipe 61' would be provided with a steam pipe 75 and nozzle 65 connected to the source of live steam for drawing and impelling the pulverized material away from and out of the pulverizing apparatus, and for reheating the spent steam from the pulverizer jets.

Having thus described the construction of the apparatus and the relation of the various parts to each other, the method of treating and handling ores and similar mineral thereby, will be next described.

Preferably the raw ore or other material to be treated is first dumped upon the floor 93' above the heating apparatus, where the gases of combustion from the boiler or heater 92 dry out the greater part of the moisture contained in the ore. The ore is then delivered to the upper supply hopper 39 and thence it is conducted through the two legs or branch pipes or branch chutes 40 to main chutes 41. During the operation of the apparatus these chutes 41 are normally filled with raw, broken or crushed ore, and by gravity the ore slowly moves downwardly in the chutes 41. To prevent any clogging of the material in these chutes, however, motion is imparted so that that length of the chain 51 which is within the chute moves, slowly downwardly and thus the feeding of the ore through the chute and the discharge of it into the petticoat hoppers 41 is continuously maintained. Here the stream or supply of ore is again divided, and discharged through the branches 43 of the petticoat hopper 42 into the feed hoppers 1—1 of the pulverizing mechanism. As the material feeds downwardly from the feed hoppers 1—1 into chambers 3—3 it meets the powerful jets of steam, (preferably superheated to the temperature of 1200° F., and under a pressure of 300 lbs. to the square inch) delivered from the alined nipples 6—6. The action of these streams or jets of steam is to draw the material from the chambers 3—3 and to drive or impel it through the openings 13 in the wearing tubes 11. The steam at this high pressure and temperature has a very high velocity and the velocity of the impact of the opposed streams is therefore twice that of either stream. The impact of the pieces of ore against each other reduces a large part of it into dust or powder. The spent steam from the jets or nozzles 6 carries these fine particles of pulverized material out of the pulverizing chamber 15 and up into the exhaust pipe 61. The steam pipe 75 extends throughout the length of the exhaust pipe 61 and since it is connected to the source of live steam supplied to the pulverizing jets or nipples 6, this pipe 75 is therefore of substantially the same temperature as that of the live steam, that is to say 1200° F. and this reheats the spent steam and maintains it in a dry condition, without suspended moisture therein.

The flaring jet 65 at the upper end of the exhaust pipe 61, in conjunction with the tapering end 62 of the said pipe and the throat or contracted portion 63 act like and virtually form a steam ejector, the tendency of which is to form a vacuum in the exhaust pipe 61. Of course, no real vacuum is formed therein but the action of the steam issuing from the jet 65 is to draw the pulverized material from the pulverizing chamber 15 upwardly through the exhaust pipe. From this point onwardly the pulverized material is impelled, by the steam issuing from the jet 65, through the discharge pipe 64 and into the settling bins or chamber 78.

A further action of the steam admitted from the flaring jet 65 into exhaust pipe 61 is to reheat the spent steam from the pulverizers. In other words, the steam coming out of the discharge pipe and into settling bin 78 is reheated by the steam coming from the jet 65 at substantially the same pressure and temperature as that supplied to the pulverizing apparatus, and this live steam coming from the jet 65 also serves to keep the entire bin 78 and the return chamber or passage 87 hot and to prevent the deposition of any moisture therein.

In the actual operation of this apparatus above described no moisture whatever appears at any point in the bin, and indeed the material deposited beneath the baffle plates 67 is dry and may be readily removed from time to time, in a dry condition, up to a point very near to the stack or chimney 90.

In operating this apparatus it is very essential that the steam which is admitted through the goose necks 9 to the pulverizing chambers 15 be at a predetermined high pressure and temperature. The desired pressure and temperature should be attained before any steam whatever is admitted through the goose necks 9 to the pulverizing chambers 15. I therefore preferably provide a steam gage 99 in the main steam supply pipe 26 at a point in advance of the gate or controlling valve 24 for admitting steam to the goose necks 9 in order that the pressure of the steam may be accurately known before it is attempted to start the apparatus into operation. I similarly provide at some point in the main steam pipe 23, near the said valve 24, a thermometer 100 of some approved type in order that the temperature of the steam may be accurately known prior to its admission to the goose necks 9.

It is also very important that substantially the same amount of steam flow through each goose neck 9 of the pulverizing mechanism, because should the pressure and consequent velocity of the steam issuing from one jet or nipple 6 be lower than that of the other, the ore, which is being pulverized between the jets will wear one of the jets or nipples 6 or the wearing tubes 11 more rapidly than the other and will also tend to wear the jets so that they will not maintain that perfect alinement with each other which is essential to a successful operation of the device or apparatus. For this purpose I preferably provide each goose neck with a manually operated regulating valve 22 whereby the amount of steam flowing through one goose neck 9 to the pulverizing chamber 15 may be regulated to correspond exactly with that passing through the other of a pair of goose necks. I also preferably provide each goose neck 9 with a thermometer 102 whereby the temperature of the steam passing through each goose neck may be accurately known.

It is also essential that the holes or openings through the nipples be in absolute alinement, and for the purpose of alining these jets and grinding them *in situ*, if necessary, the openings 19' in the chambers, normally closed by the gates 19, are large enough to permit of the alining and grinding of the openings through the nipples 6.

If the openings 7 through the nipples 6 are too short in length the steam passing therethrough at high velocity and temperature will tend to unevenly wear the same, and thus destroy the perfect alinement of the jets. This tendency is, however, greatly reduced if the bore 7 through the nipples 6 from the discharge end thereof inwardly be made relatively long. For this purpose I preferably make the length of the openings 7 through the nipples eight or ten times the diameter thereof.

Such ore or material as may not be reduced to the desired state of fineness will settle and collect at the bottom of the exhaust tube 61, and in the bottom of the pulverizing chamber 15, whence it may be removed from time to time by opening the gate 57 at the bottom of the pulverizing chamber 15 and allowing the ore collected or accumulated therein to fall downward into the tailing chute 54, by means of which it is conducted to the hopper 27 and elevated by the conveyer chain 29 to the upper hopper 39. Similarly, material which is not pulverized and which may collect in the chambers 3 may be removed by opening the gates 19, which will permit the ore to fall into the branches 59 and 60 of the tailing chute 54 and back into the lower hopper 27.

I preferably finally grind and aline the openings 7 through the nipples 6 by inserting in both nipples a long arbor or mandrel and working it around and back and forth in the openings with a very fine abrasive and so produce practically perfect alinement of the openings 7.

The apparatus above described may be successfully used in pulverizing ores or minerals such as are adapted to be used for pigments. The ore is very rapidly pulverized and the finest particles are readily separated from the coarser particles by the current of steam created in the exhaust pipe. The apparatus also may be used for pulverizing clay or similar materials. Further, certain ores or mineral matter may be composed of two or more materials differing in specific gravity from each other. By the use of the said apparatus the lighter material when pulverized may be readily separated from the heavier in the pulverizing apparatus itself by regulating the amount of draft or suction created in the exhaust pipe.

As has been heretofore indicated the apparatus is arranged and adapted to provide for the introduction of an active gas or vapor into the lower end of the exhaust flue during the operation of the device. The chemical gas or vapor so admitted will readily have access and come into contact with every point of the pulverized particles during their transit from the pulverizing chamber to the settling bin, and even while the material is settling in the bin it will be enveloped by this active gas so admitted. This feature of construction and operation of the device is particularly useful in the bleaching of clay during the pulverization thereof. Carbonic acid gas may be admitted into the exhaust flue to act upon the particles suspended in the current of steam by means of which it is being carried to and into the settling bin. Beyond the making of pigments this introduction of a gas which will chemically affect the particles while suspended and in transit is also of utility.

Having thus described my invention what I claim and desire to protect by Letters Patent of the United States is:

1. In a pulverizing apparatus the combination of an impact pulverizer, comprising a pair of alined nozzles spaced apart and arranged to discharge toward each other, means to supply superheated steam at high pressure and temperature simultaneously to said nozzles, means to equalize the amount of steam delivered to each nozzle, and means to conduct material to be pulverized to said nozzle whereby pieces or particles of said material are crushed and pulverized by their impact against each other, with an exhaust pipe communicating with said pulverizer, and means to create a current of steam in said exhaust pipe away from said pulverizer whereby the finer particles are separated from the larger particles and are conveyed away from the said pulverizer, and to reheat the spent steam throughout substantially the entire length of said exhaust pipe.

2. In a pulverizing apparatus the combination of an impact pulverizer operating by the impact of two opposed streams of material impelled against each other at high velocity by jets of superheated steam at high temperature and pressure, a boiler for supplying superheated steam at high pressure to said impact pulverizer, an elevated floor or platform for holding a supply of material to be delivered to said pulverizer, means to heat said platform to dry said ore by the waste gases of combustion from said boiler, and means to deliver said material from said platform to said pulverizer.

3. In a pulverizing apparatus the combination of an impact pulverizer operated by the impact of two opposed streams of material impelled against each other at high velocity by jets of superheated steam at high temperature and pressure, a boiler for supplying superheated steam at high pressure to said impact pulverizer, an elevated floor or platform for holding a supply of material to be delivered to said pulverizer means to heat said platform to dry said material by the waste gases of combustion from said boiler, and supply chutes extending downwardly from said platform to said pulverizer.

4. In a pulverizing apparatus the combination of an impact pulverizer operated by the impact of two opposed streams of material impelled against each other at high velocity by jets of superheated steam at high temperature and pressure, a boiler for supplying superheated steam at high pressure to said impact pulverizer, an elevated floor or platform for holding a supply of material to be pulverized, means to heat said platform to dry said material by the waste gases of combustion from said boiler, chutes extending downwardly from said platform to said pulverizer, means to exhaust the pulverized material from said pulverizer, and means to return the treated but unpulverized material from said pulverizer to the top of said chute.

5. The method of pulverizing materials which consists in drying the raw material simultaneously heating and conveying the same into the path of a pair of oppositely alined streams of superheated steam under high pressure whereby said material is pulverized by the impact of the particles against each other under the influence of said steam, a flue through which the pulverized material is conducted away from said pulverizer, introducing superheated steam at high pressure and temperature into said flue to create a strong draft in said flue to reheat and superheat said spent steam and to separate as a dust the lighter particles of the pulverized material from the heavier and unpulverized material, and to convey it to a settling bin, and maintaining the temperature of the steam while conveying the pulverized material to and into said settling bin, so high that the steam is dry substantially until it makes its exit from said settling bin.

6. The method of treating mineral matter which consists in dry pulverizing the same by the impact of two streams of said mineral matter against each other impelled by opposed jets of superheated steam at high pressure and temperature, immediately conveying the dry pulverized material to and into a settling bin by a current of superheated steam of substantially the pressure and temperature as the steam of said jets, and simultaneously subjecting the pulverized material to the action of a gas or vapor which chemically affects the pulverized material, while said pulverized material is held suspended in and by said current of steam.

7. The method of treating clay which consists in dry pulverizing the same by impelling two streams of unpulverized clay against each other by opposed jets of superheated steam at high pressure and temperature, immediately conveying the pulverized clay as a dust to and into a settling bin by a current of superheated steam and simultaneously subjecting the dry pulverized clay to the action of carbonic acid gas while it is held suspended in and by said current of steam.

In witness whereof I have hereunto set my hand this twenty third day of April, 1914.

ALFRED B. WILLOUGHBY.

Witnesses:
   FREDERIC A. LEAMY,
   LORENZO J. RILEY.